United States Patent [19]

Kamiya et al.

[11] Patent Number: 4,538,081
[45] Date of Patent: Aug. 27, 1985

[54] ELECTRIC MOTOR WITH HYDRODYNAMIC PRESSURE AND MAGNETIC THRUST BEARINGS

[75] Inventors: Masashi Kamiya, Tokyo; Mitsuo Sumiya, Yokohama; Ryoji Yamaguchi, Tokyo, all of Japan

[73] Assignee: Tokyo Shibaura Denki Kabushiki Kaisha, Kawasaki, Japan

[21] Appl. No.: 464,148

[22] Filed: Feb. 7, 1983

[30] Foreign Application Priority Data

Feb. 13, 1982 [JP] Japan .................................. 57-20681

[51] Int. Cl.³ ......................... F16C 17/16; H02K 7/09
[52] U.S. Cl. ...................................... 310/90; 308/10; 310/154; 384/115
[58] Field of Search .................. 308/10; 384/114, 115, 384/113; 310/90

[56] References Cited

U.S. PATENT DOCUMENTS 3,612,630  10/1971  Rosensweig ........................ 308/10
3,656,819   4/1972  Hirs ........................................ 308/9

FOREIGN PATENT DOCUMENTS 550788   1/1943  United Kingdom .
1064374  9/1963  United Kingdom .
1149192  5/1966  United Kingdom .
2046370  1/1980  United Kingdom .
2064676  11/1980  United Kingdom .

OTHER PUBLICATIONS

Kameyama et al., "Advanced Rotating Mirror Laser Scanner", NHK Labs., Note Ser. 242, 1979.

Primary Examiner—Peter S. Wong
Assistant Examiner—D. L. Rebsch
Attorney, Agent, or Firm—Cushman, Darby and Cushman

[57] ABSTRACT

In an electric motor unit, a spindle is rotatably supported by bearing sections of a dynamic-pressure type, and is floated along its axis by a magnetic thrust bearing. At the bearing sections, air current layers are formed in the gaps between journals of the spindle and bearings by elongated parallel grooves formed along the axis, and the spindle is supported by pressure distributed over the air current layers. In the thrust bearing, rotor magnets fixed to the spindle are attracted to stator magnets fixed to the housing and surrounding the rotor magnets. The spindle is floated along the axis by the attraction between the magnets.

3 Claims, 5 Drawing Figures

ELECTRIC MOTOR WITH HYDRODYNAMIC PRESSURE AND MAGNETIC THRUST BEARINGS

BACKGROUND OF THE INVENTION

This invention relates to an electric motor unit capable of high-speed, high-accuracy rotation of a motor shaft, more specifically to an electric motor unit for high-speed, high-accuracy rotation of a polygonal mirror in a laser printer, for example.

Recently, printers using lasers have been developed. One such prior art laser printer comprises, for example, a semiconductor laser 1, a polygonal mirror 2, and a drum 4 having a photoconductor surface 3, as shown in FIG. 1. In this laser printer, a laser beam generated from the semiconductor laser 1 is converged by a beam compressor 5 and directed toward a modulator 6. In the modulator 6, the intensity of the laser beam is modulated in response to an electrical signal. After passing the modulator 6, the laser beam is projected on the polygonal mirror 2 through a beam expander 7. Reflected by a reflecting surface of the polygonal mirror 2, the laser beam is then projected on the photoconductor surface 3 of the drum 4 through a projection lens 9. Since the polygonal mirror 2 is rotated at a constant speed, the laser beam reflected by the reflecting surface of the polygonal mirror 2 is deflected so that the photoconductor surface 3 is scanned with the laser beam. Since the laser beam is intensity-modulated by the modulator 6, and the drum 4 is rotated in a specified direction at a constant speed, a latent image, such as a pattern or characters, is formed on the photoconductor surface 3.

In the aforementioned laser printer, the polygonal mirror 2 is rotated at a high and constant speed with high accuracy by a motor unit 8. In order to provide this kind of rotation of the polygonal mirror 2, the motor unit 8 must have the following properties:
(i) No contamination of the polygonal mirror by spindle oil or the like during rotation.
(ii) Long life.
(iii) Less friction torque loss at the start or during steady rotation.
(iv) Ease of transport.
(v) Ease of balancing.
(vi) No rotating members having a complicated vibration mode, not undergoing a high-frequency vibration.

In a conventional motor unit which meets these requirements, the spindle is rotatably supported by a bearing of hydro dynamic-pressure type. Dynamic-pressure type bearings include bearings of herringbone and tilting-pad types. The bearings of both these types, however, are not easy to manufacture.

The use of a non-controlled, repulsion-type permanent magnet bearing as the thrust bearing for the spindle is disclosed in Japanese Patent Publication No. 6854/78. However, it is hard for this magnetic bearing to balance itself in a static manner. If an external dynamic force is applied to the magnetic bearing, the rigidity of the bearing varies with the direction of the unfixed vector of the working force. Thus, the magnetic bearing is poor in both stability and in rigidity. As compared with the non-controlled magnetic thrust bearing, a controlled magnetic thrust bearing combining a permanent magnet and a coil has the advantages of good stability and high rigidity. Because it requires peripheral equipment, however, the controlled bearing makes the motor complicated in construction. Thus, it is difficult to manufacture such a motor at low cost.

An induction motor or DC motor may also be used for the motor.

However, the induction motor is provided with many accessories, and so becomes expensive, and it also produces great heat. And the DC motor cannot easily maintain a steady speed.

SUMMARY OF THE INVENTION

The object of this invention is to provide an electric motor unit capable of high-speed, high-accuracy rotation with less friction and enjoying a longer service life.

According to the invention, there is provided an electric motor unit which comprises a spindle having a journal with a number of grooves extending parallel to one another along the axis of the spindle, a rotor mounted on the spindle to rotate therewith, a stator for rotating the rotor, a bearing receiving the journal and having an inner surface facing the outer surface of the journal with a gap therebetween, a motor housing on which the bearing and the stator are fixed, and means for floating the spindle, including at least one rotor magnet fixed to the spindle and a stator magnet in which the rotor magnet is inserted, the stator magnet being fixed to the housing and having an inner surface facing the outer surface of the rotor magnet with a gap therebetween, the rotor and stator magnets having magnetic poles of opposite polarity on their outer and inner surfaces facing each other.

DETAILED DESCRIPTION OF THE PREFERRED EMBODIMENT

Figure 1:
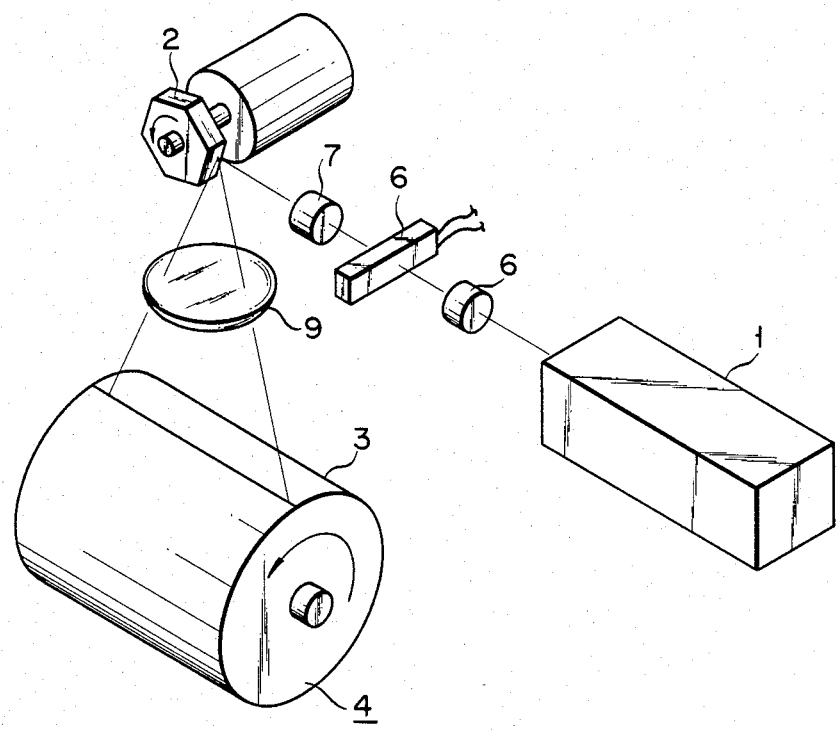
FIG. 1 is a schematic view of a conventional laser printer system.
Figure 2:
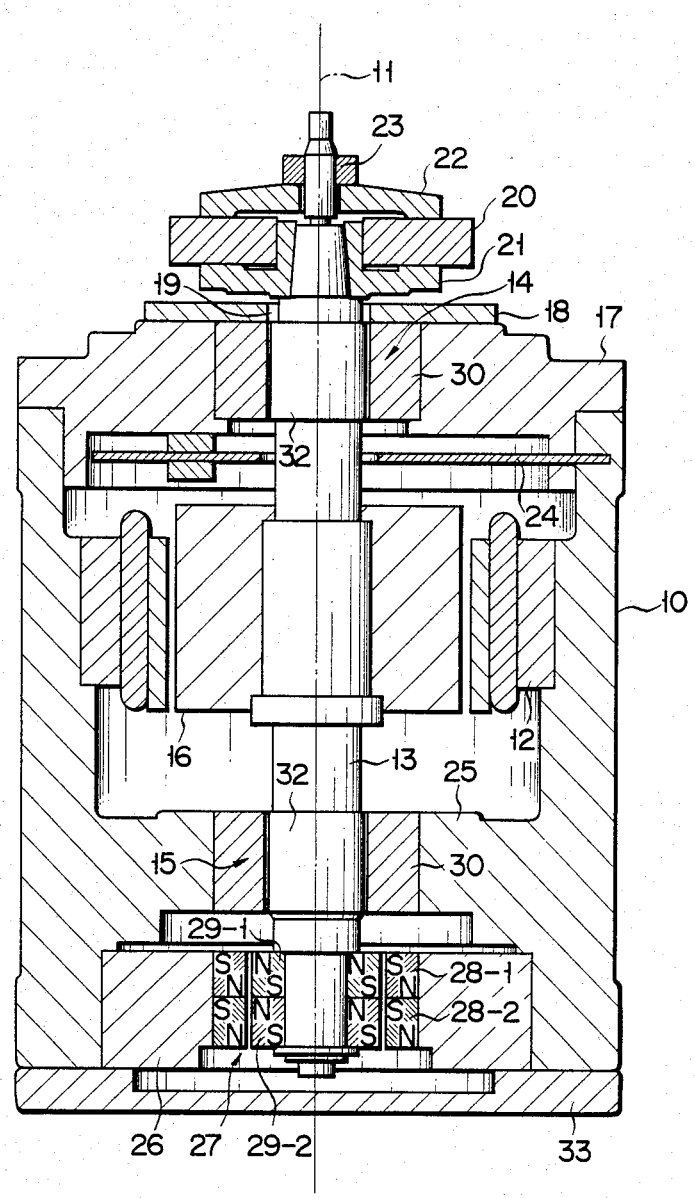
FIG. 2 is a sectional view of an electric motor unit according to an embodiment of this invention.
Figure 3:
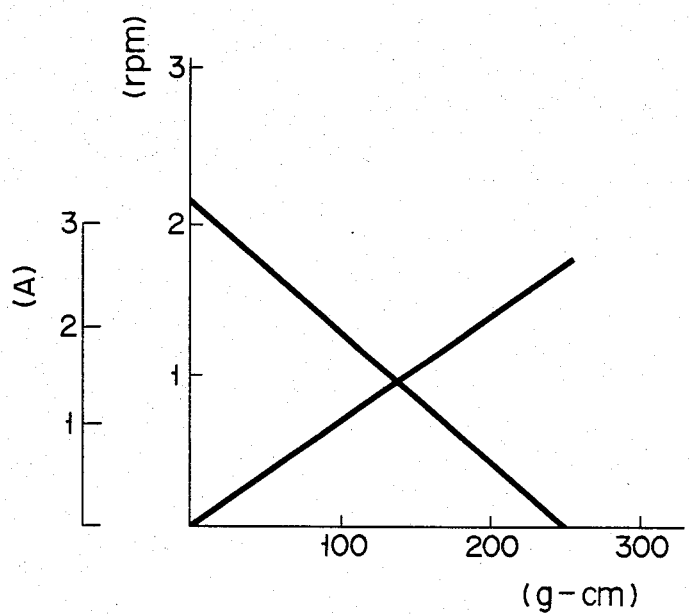
FIG. 3 is a graph showing the motor characteristics of the motor unit of FIG. 2.

Referring now to FIG. 2, there is shown a motor unit according to an embodiment of this invention. In this motor unit, a field permanent magnet 12 as a stator having a number of magnetic poles is fixedly housed in a cylindrical housing 10 so as to surround a central axis 11 of the housing 10. A spindle 13 of the motor unit is supported by a pair of bearing sections 14 and 15 of a hydro dynamic-pressure type as will be described is detail later, and is coaxial with the central axis 11. The spindle 13 is fitted with an armature 16 as a rotor which faces the inner surface of the permanent magnet 12. Preferably, the motor is of a slotless DC-brush type in which the number of substantially active conductors of winding is reduced to lower the current density, as shown in FIG. 3, so that the motor speed can be very accurately controlled with high accuracy.

A base cover 17 fitted with the first bearing section 14 is fixed in one opening of the cylindrical housing 10. A dust cover 18 for preventing dust from penetrating the first bearing section 14 is mounted on the base cover 17.

One end portion of the spindle 13 projecting from a spindle insertion hole 19 of the dust cover 18 is fitted with a pair of washers 21 and 22 for setting a polygonal mirror 20. The polygonal mirror 20 is held between the washers 22 and 21, and is securely fixed to the spindle 13 without inclination by means of a setscrew 23 which is screwed on the spindle 13. A PC plate 24 having a built-in circuit for controlling the current supply to the armature 16 is disposed in that portion of the inside space of the housing 10 which lies between the base cover 17 and the field permanent magnet 12. The PC plate 24 is fixed to the housing 10.

A cylindrical support portion 25 for supporting the second bearing section 15 is formed inside the housing 10. A cylindrical member 26 is fitted in the other opening of the housing 10, and fixed by a cover 33 which is attached to the other opening of the housing 10. The cylindrical member 26 is provided with a magnetic thrust bearing section 27, which will be described in detail in the following paragraph with reference to FIG. 4.

Figure 4:
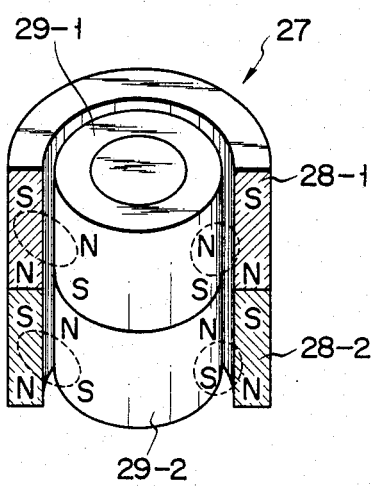
FIG. 4 is a perspective sectional view schematically showing a magnetic thrust bearing shown in FIG. 2.

Ring-shaped permanent magnets 28-1, 28-2, 28-3 and 28-4 are fixedly fitted in the cylindrical member 26 to form a stator of the magnetic thrust section 27. The permanent magnets 28-1, 28-2, 28-3 and 28-4 are coaxial with the central axis 11 of the rotor 32. Each of the permanent magnets 28-1 to 28-4 is made of, e.g., ferrite and magnetized in its radial direction. The permanent magnets 28-1 to 28-4 are piled up (or superposed) so that the poles of the outer surfaces thereof are alternately arranged as shown in FIG. 4. Also, ring-shaped permanent magnets 29-1 to 29-4 are fixed to the spindle 13 to form a rotor of the magnetic thrust bearing section 27. The permanent magnets 29-1 to 29-4 are also coaxial with the central axis 11 of the rotor 16, and are arranged so that their outer surfaces face the inner surfaces of the stator permanent magnets 28-1 to 28-4 with a narrow gap, e.g., a gap of hundreds of microns, between them. Also made of, e.g., ferrite, the rotor permanent magnets 29-1 to 29-4 are magnetized so as to be opposite in polarity to their facing stator magnets 28-1 to 28-4, respectively. An optional number of magnets may be used depending on the weight of the spindle 13, the polygonal mirror 20, etc., and the magnetic force of the magnets. Although the stator and rotor magnets are normally equal in number, the number of the stator or rotor magnets may be an integral multiple of that of their partners. Also in this case, the facing magnetic pole surfaces of the stator and rotor magnets need be opposite in polarity to one another.

Figure 5:
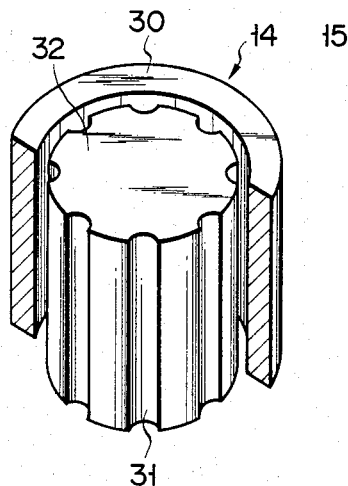
FIG. 5 is a perspective sectional view schematically showing a bearing section of a hydro dynamic-pressure type shown in FIG. 2.

As shown in FIG. 5, the hydro dynamic-pressure type bearing sections 14 and 15 are each formed of a cylindrical bearing 30 with a smooth inner surface, and a journal 32 which faces the inner surface of the bearing 30 with a gap of, e.g., several microns to tens of microns between them and has elongate grooves 31 formed substantially parallel to the axis 11 and substantially at regular intervals around the spindle 13. Each of the grooves, for example, has a width of 100 μm and a depth of 10 μm. Although each elongated groove 31 has an arcuate cross section in FIG. 5, it is not limited to such a configuration. For example, it may have a V-shaped cross section.

In the motor unit described above, magnetic flux is formed between the stator and rotor permanent magnets 28-1, 28-2, 29-1 and 29-2 of the magnetic thrust bearing section 27, as represented by broken lines in FIG. 4, so that the stator and rotor permanent magnets attract one another. Thus, the spindle 13 is kept axially floated by the permanent magnets 28-1, 28-2, 29-1 and 29-2. When controlled current is supplied to the armature 16, the spindle 13 starts to rotate. Since the spindle 13 at this time is floated axially by the magnetic thrust bearing section 27, the initial starting torque is reduced to 50 g/cm or less simply by the sliding frictional force of the dynamic-pressure type bearing sections 14 and 15. Thus, the friction torque loss is minimized. If subjected to an axial external force, the spindle 13 is normally restored to a fixed position by the radial attraction which the magnetic thrust bearing 27 applies to the spindle 13. Thus, the spindle 13 is prevented from being vibrated by the axial external force. When the rotation of the spindle 13 reaches a predetermined speed, air currents flow from the outside of the journals 32 into the elongated grooves 31 to form air current layers with a certain pressure distribution in the gaps between the journals 32 and the bearings 30. Accordingly, the spindle 13 can rotate stably in a non-contact manner. If the rotating speed is $10^4$ rpm, then the wobbling of the spindle 13 may be reduced to 0.5 μm or less by proper balance adjustment. Since the load torque of the spindle 13 at a steady rotation is small enough, e.g., 3 W for $10^4$ rpm rotation, generation of heat from the armature 16 can be minimized. Including the journals 32 with the grooves 31 extending along the axis 11, the dynamic-pressure type bearing sections 14 and 15 can be manufactured at lower cost than the bearings of the herringbone or tilting-pad type and the journals 32 can rotate in both forward and reverse directions. Since the bearing sections 14 and 15 require no lubricating oil, they will never soil the polygonal mirror 20.

According to the motor unit of this invention, as described above, the spindle is supported by an attraction-type magnetic thrust bearing and dynamic-pressure type journal bearings, and can continue stable high-speed rotation with reduced friction torque at the start. As compared with the conventional motor unit with substantially the same performance, moreover, the motor unit of the invention can be simplified in construction and reduced in manufacturing cost.

What we claim is:

1. An electronic motor unit, comprising:

a spindle having a journal with a number of grooves extending parallel to one another along the rotation axis of the spindle, each of said grooves having an arcuate cross section;

a rotor mounted on the spindle to rotate therewith;

a stator for rotating the rotor;

a bearing of a hydrodynamic pressure type, receiving the journal and having an inner surface facing the outer surface of the journal with a gap therebetween;

a motor housing on which the bearing and the stator are fixed;

a magnetic thrust bearing section including an even number of superposed rotor magnets fixed to the spindle, each having an outer surface, and including an equivalent number of stator magnets in which the rotor magnets are inserted, the stator magnets being superposed and fixed to the housing, each of said stator magnets having an inner surface facing the outer surface of the corresponding rotor magnet with a gap therebetween, the rotor and stator magnets having magnetic poles of opposite polarity on their outer and inner surfaces facing each other; wherein during rotation of said journal, gas flows into said gap formed between said journal and said bearing to thereby produce hydrodynamic pressure.

2. The electric motor unit according to claim 1 further comprising a polygonal mirror fixed to the spindle to rotate therewith.

3. The electric motor unit according to claim 1, wherein said stator magnet is cylindrical.

* * * * *